Nov. 17, 1931.   S. P. THOMAS   1,832,335
ADJUSTABLE AND REVERSIBLE PROPELLER
Filed May 31, 1928   2 Sheets-Sheet 1
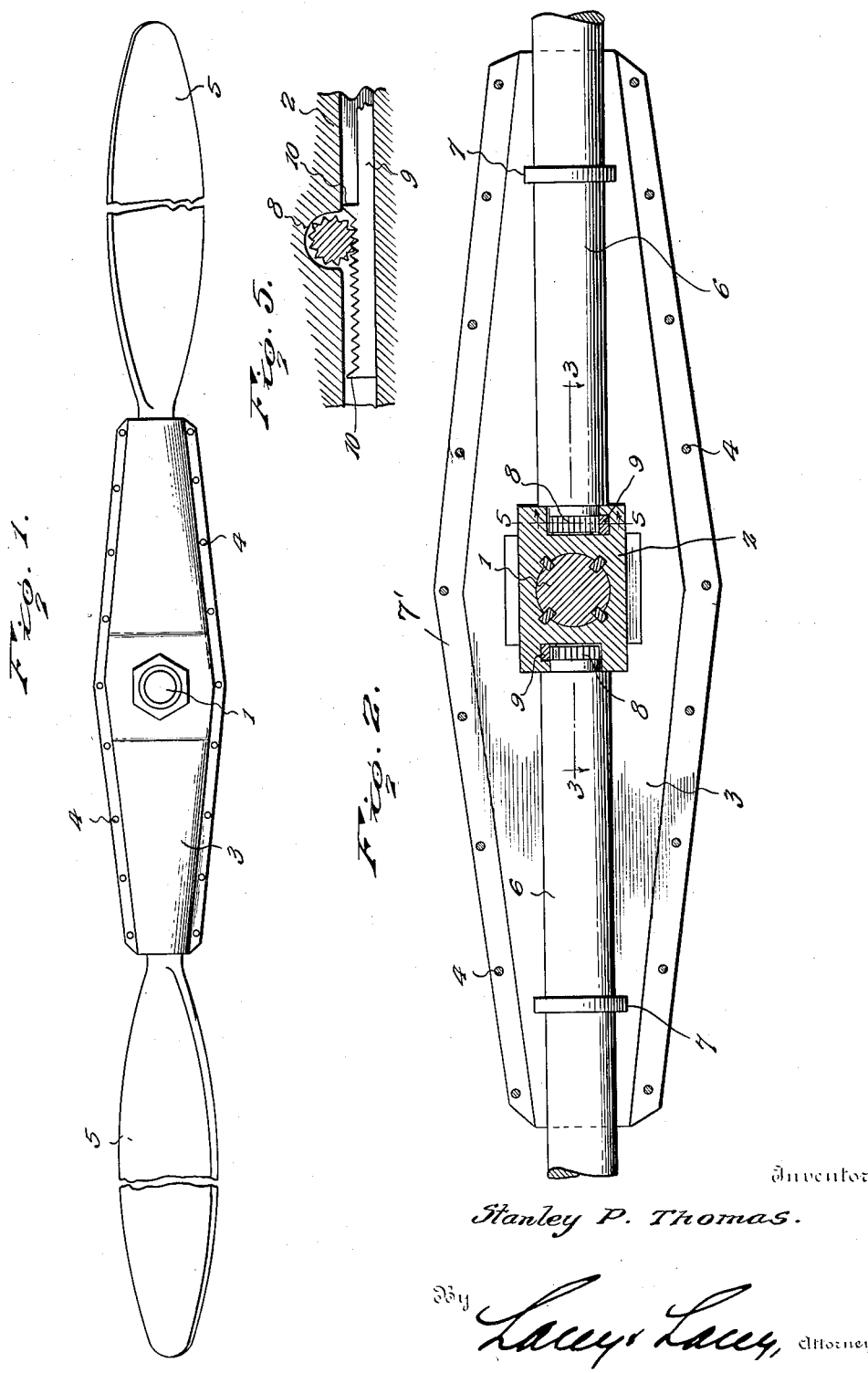
Inventor
Stanley P. Thomas.
By Lacey & Lacey, Attorneys Nov. 17, 1931. S. P. THOMAS 1,832,335
ADJUSTABLE AND REVERSIBLE PROPELLER
Filed May 31, 1928 2 Sheets-Sheet 2
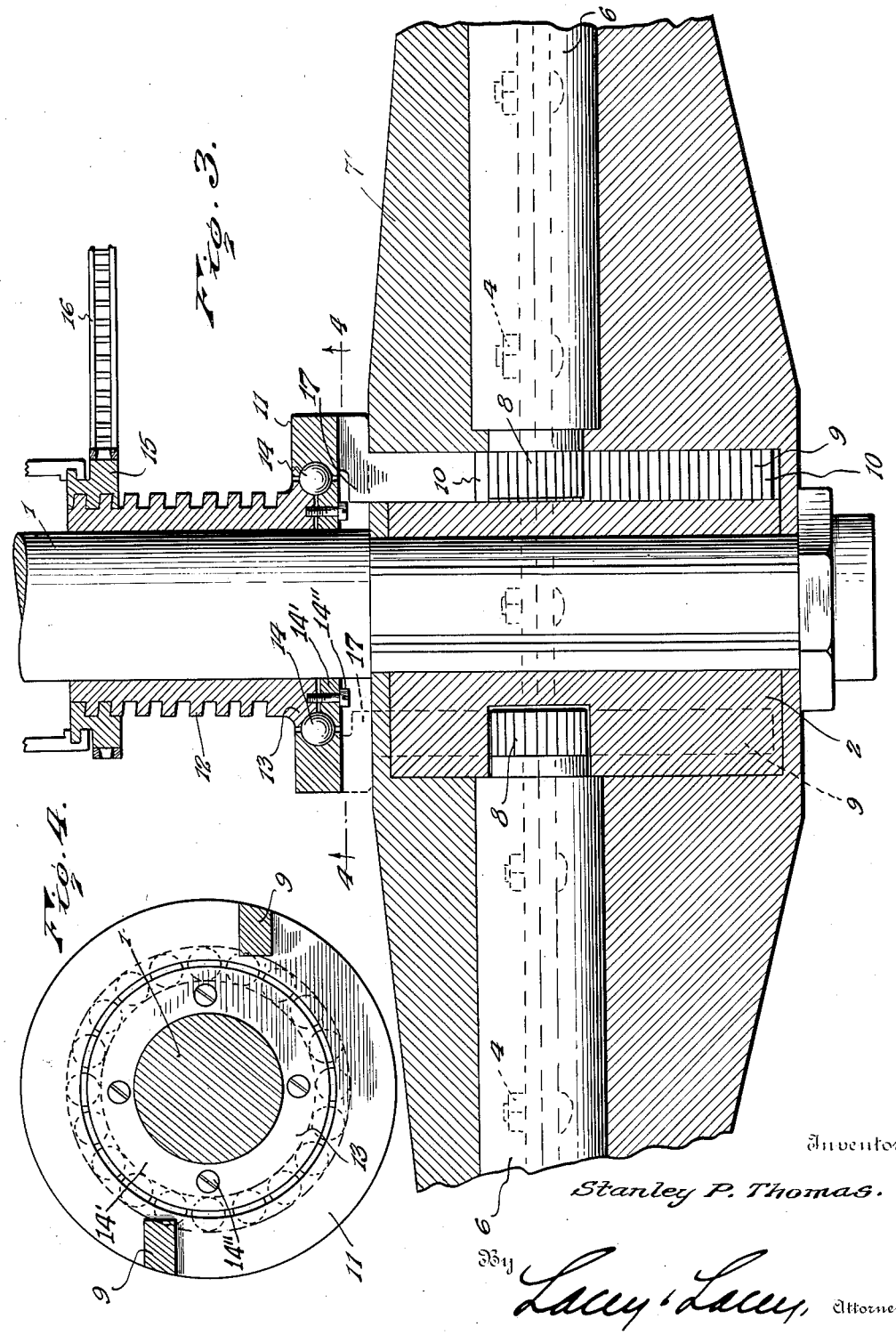

Patented Nov. 17, 1931

1,832,335

UNITED STATES PATENT OFFICE

STANLEY P. THOMAS, OF MERCED, CALIFORNIA

ADJUSTABLE AND REVERSIBLE PROPELLER

Application filed May 31, 1928. Serial No. 282,024.

This invention relates to propellers for aircraft.

This invention resides more particularly in the mountings and the means whereby the pitch of the propeller blade may be adjusted.

The invention provides for ready assemblage of the parts and means for positive adjustment of the pitch of the propeller blades while at the same time providing a sturdy and substantial structure.

While the drawings illustrate a preferred embodiment of the invention, it is to be understood that in adapting the means to meet specific needs and requirements, the design may be varied and such other changes in the minor details of the invention as claimed, without departing from the spirit thereof.

For a full understanding of the invention and the merits thereof, reference is to be had to the following description and the drawings hereto attached, in which Figure 1 is a rear view of a propeller embodying the invention;

Figure 2 is a view similar to Figure 1 with the hub in section and the rear half of the bearing removed, the parts being shown on a larger scale;

Figure 3 is an enlarged fragmentary sectional view on the line 3—3 of Fig. 2 looking in the direction of the arrows;

Figure 4 is a detail sectional view on the line 4—4 of Fig. 3 looking in the direction designated by the arrows; and Figure 5 is a fragmentary sectional view on the line 5—5 of Fig. 2.

The numeral 1 denotes the drive shaft and 2 the hub keyed thereon. The bearing 3 is mounted upon the drive shaft 1 and rotates therewith. This bearing is elongated and tapers toward opposite ends from a medial point and is formed with outwardly disposed flanges which are apertured to receive bolts 4. For convenience the bearing 3 is formed of similar sections or halves which when assembled are made secure by the bolts or fastenings 4 in the manner stated. The blades or vanes 5 of the propeller have their arms 6 held in opposite ends of the bearing 3 and retained therein by an annular flange 7 which is received in a groove formed in the parts or sections 7' of the bearing 3. The inner ends of the arms 6 are reduced and formed with teeth 8 which mesh with the teeth of rack bars 9 which are slidably mounted in channels or ways formed in the hub 2. Stops 10 are formed at opposite ends of the toothed portions of each of the rack bars 9 to limit the movement of the rack bars in each direction and prevent any possible disengagement thereof from the pinions 8 formed by the teeth at the inner ends of the arms 6.

A ring 11 concentric with the drive shaft 1 has the rack bars 9 connected thereto. This ring is rotatable with the drive shaft and is adapted to have a movement imparted thereto towards and away from the bearing 3 whereby to impart a longitudinal movement to the rack bars and a turning of the propellers to change the pitch of the blades or vanes. A sleeve 12 concentric with the drive shaft 1 and mounted to move longitudinally and held from rotating, is formed at one end with an outer flange 13. Matching grooves are formed in the opposing faces of the ring 11 and flange 13 and receive balls 14, which serve the dual function of locking and antifriction means between the two parts. The balls are removably confined in place by a cap plate 14' which is secured by screws 14" to the end of the sleeve 12. Longitudinal movement imparted to the sleeve 12 is transmitted through the balls 14 to the ring 11 and rack bars 9, whereby rotation of the propeller blades is effected to change their pitch. The sleeve 12 is externally screw threaded and receives a nut 15. The nut 15 is held against any longitudinal movement but is free to rotate to impart a longitudinal movement to the sleeve 12. For convenience of rotating the nut 15 it is formed upon its outer edge with teeth which cooperate with a sprocket chain 16 which may extend to any convenient point to be operated when it is required to change the pitch of the propeller blades. The ends 17 of the racks, it will be noted, are offset between the ring and the bearing and also these offset ends project over the cap plate which is attached by screws to the sleeve, as best shown in Fig. 1. Thus, these offset ends perform the function of stops to limit advance of the ring toward the bearing and also prevent accidental escape of the cap plate should the screws become loosened in service.

Having thus described the invention, I claim:

A variable pitch propeller comprising a hub, a bearing fixed on the hub, propeller blades rotatably mounted in the bearing, a ring, an externally threaded sleeve, ball bearings between the sleeve and the ring, a cap plate secured by screws to the end of the sleeve and removably confining the ball bearings in place, racks having offset ends forming stops to limit advance of the sleeve toward the bearing, said offset ends projecting over said cap plate, pinions in said bearing carried by said propeller blades and engaging said racks, and a nut on the sleeve for advancing and retracting the sleeve to change the pitch of said blades.

In testimony whereof I affix my signature.

STANLEY P. THOMAS. [L. S.]